(12) United States Patent
Sun

(10) Patent No.: US 12,415,415 B2
(45) Date of Patent: Sep. 16, 2025

(54) ACTUATING ASSEMBLY, AND FUEL FILLER OR CHARGING INLET FLIP ASSEMBLY

(71) Applicant: Illinois Tool Works Inc., Glenview, IL (US)

(72) Inventor: Yuan Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 457 days.

(21) Appl. No.: 18/096,359

(22) Filed: Jan. 12, 2023

(65) Prior Publication Data
US 2023/0241964 A1    Aug. 3, 2023

(30) Foreign Application Priority Data

Jan. 28, 2022   (CN) .......................... 202210108257.3

(51) Int. Cl.
*B60K 15/05*   (2006.01)
*B60L 53/16*   (2019.01)

(52) U.S. Cl.
CPC .............. *B60K 15/05* (2013.01); *B60L 53/16* (2019.02); *B60K 2015/053* (2013.01); *B60K 2015/0538* (2013.01); *B60K 2015/0561* (2013.01)

(58) Field of Classification Search
CPC .. B60K 15/05; B60K 15/053; B60K 15/0515; B60K 15/0561; B60K 15/0576
USPC ...................................... 296/97.22
See application file for complete search history.

(56) References Cited

U.S. PATENT DOCUMENTS 9,862,265 B2 *   1/2018   Lee ...................... B60K 15/05
10,328,792 B2 *  6/2019   Lee ...................... B60K 15/05

FOREIGN PATENT DOCUMENTS

DE   102011056262 B4 *  5/2018   ............. E05B 81/06
DE   102017115106 A1 *  1/2019   ............. B60K 15/03

OTHER PUBLICATIONS

DE102011056262 Text (Year: 2018).*
DE102017115106 Text (Year: 2019).*

* cited by examiner

*Primary Examiner* — Dennis H Pedder
(74) *Attorney, Agent, or Firm* — McAndrews, Held & Malloy, Ltd.

(57) ABSTRACT

The present disclosure relates to an actuating assembly and a fuel filler or charging inlet flip assembly. The actuating assembly comprises a driving gear and a transmission gear. The transmission gear is configured to be capable of rotating in a first direction to open the flip and in a second direction to close the flip, driven by the driving gear. An outer periphery of the driving gear is provided with a first outer periphery portion and a second outer periphery portion, the first outer periphery portion is provided on one side of the second outer periphery portion in a circumferential direction, the first outer periphery portion comprises a plurality of driving teeth, the second outer periphery portion comprises a driving gear abutting portion. The actuating assembly can allow for a reduced machining accuracy, and thus allow for a smoother engagement of the driving gear and the transmission gear.

10 Claims, 14 Drawing Sheets

ACTUATING ASSEMBLY, AND FUEL FILLER OR CHARGING INLET FLIP ASSEMBLY

RELATED APPLICATIONS

The present application claims the benefit of Chinese Patent Application No. 202210108257.3, filed Jan. 28, 2022, titled "Actuating Assembly, and Fuel Filler or Charging Inlet Flip Assembly," the contents of which are hereby incorporated by reference.

TECHNICAL FIELD

The present disclosure relates to an actuating assembly and a flip assembly, and in particular to a fuel filler or charging inlet flip assembly for a vehicle.

BACKGROUND

A fuel filler or charging inlet flip of a vehicle is configured to expose or cover a fuel filler or a charging inlet of the vehicle. The fuel filler or charging inlet flip is movably mounted on a vehicle body. When refueling or charging is not required, the fuel filler or charging inlet flip needs to be retained in a closed position. When refueling or charging is required, the flip is moved from the closed position to an open position. An actuating assembly is used for controlling the movement of the flip, so as to achieve the functions described above.

SUMMARY

The present disclosure relates generally to an actuating assembly for actuating a flip movably mounted on a base, substantially as illustrated by and described in connection with at least one of the figures, as set forth more completely in the claims. The concept, specific structures and resulting technical effects of the present disclosure will be further described below with reference to the accompanying drawings so as to fully understand the objective, features and effects of the present disclosure.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
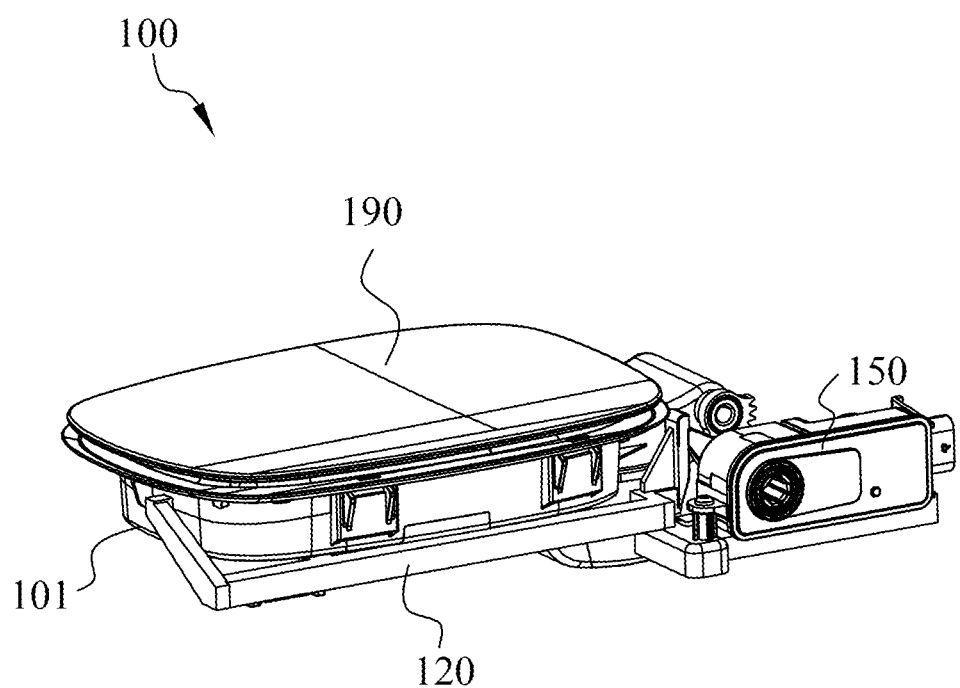
FIG. 1A is a perspective view, viewed from the front, of an embodiment of a fuel filler or charging inlet flip assembly of the present disclosure, with a flip being in a closed state.

Various specific implementations of the present disclosure will be described below with reference to the accompanying drawings which constitute part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the example orientations as shown in the accompanying drawings. Since the embodiments disclosed in the present disclosure can be arranged in different directions, these terms indicating directions are merely illustrative and should not be considered as limitations.

According to a first aspect of the present disclosure, the present disclosure provides an actuating assembly for actuating a flip movably mounted on a base. The actuating assembly comprises a driving gear and a transmission gear. The driving gear is configured to be capable of being driven to rotate. The transmission gear is configured to be capable of rotating in a first direction to open the flip relative to the base and in a second direction opposite to the first direction to close the flip relative to the base, driven by the driving gear. An outer periphery of the driving gear is provided with a first outer periphery portion and a second outer periphery portion, the first outer periphery portion is provided on one side of the second outer periphery portion in a circumferential direction, the first outer periphery portion comprises a plurality of driving teeth, the second outer periphery portion comprises a driving gear abutting portion, and the driving gear abutting portion is partly provided along an axial direction, extends a distance in a circumferential direction, and is connected to adjacent driving teeth. An outer periphery of the transmission gear is provided with a plurality of transmission teeth and an abutting tooth, the abutting tooth is provided on one side of the plurality of transmission teeth in a circumferential direction, the plurality of transmission teeth and the abutting tooth are capable of engaging with the plurality of driving teeth so that the driving gear is capable of driving the transmission gear to rotate. The driving gear and the transmission gear are configured such that when the flip is closed and the driving gear remains stationary, the abutting tooth is capable of abutting the driving gear abutting portion, thereby blocking rotation of the transmission gear in the first direction, thereby blocking the flip from being opened.

According to the actuating assembly of the first aspect of the present disclosure, the driving gear abutting portion does not drive the transmission gear to rotate.

According to the actuating assembly of the first aspect of the present disclosure, the driving gear abutting portion has a top portion configured to be capable of cooperating with the abutting tooth to block rotation of the transmission gear.

According to the actuating assembly of the first aspect of the present disclosure, the abutting tooth is partly provided in the axial direction of the transmission gear.

According to the actuating assembly of the first aspect of the present disclosure, the outer periphery of the transmission gear is further provided with a transmission gear abutting portion, the transmission gear abutting portion and the plurality of transmission teeth are provided on two opposite sides of the abutting tooth, and the transmission gear abutting portion is partly provided in the axial direction of the transmission gear and is staggered from the abutting tooth. The second outer periphery portion further comprises a driving gear limiting tooth, and the driving gear limiting tooth is partly provided along the axial direction and staggered from the driving gear abutting portion. An accommodating portion is provided between the driving gear limiting tooth and the adjacent driving teeth for accommodating the transmission gear abutting portion. The driving teeth connected to the driving gear abutting portion are capable of pushing the transmission gear abutting portion to rotate the transmission gear.

According to the actuating assembly of the first aspect of the present disclosure, the driving gear limiting tooth has a driving gear limiting surface, the transmission gear abutting portion has a transmission gear limiting surface, and the driving gear limiting surface is capable of cooperating with the transmission gear abutting portion to limit the range of rotation of the driving gear relative to the transmission gear.

According to the actuating assembly of the first aspect of the present disclosure, the top portion is an arc surface, the driving gear rotates about a driving axis, and a distance between the top portion and the driving axis is equal to a distance between the tooth top of the plurality of driving teeth and the driving axis.

According to the actuating assembly of the first aspect of the present disclosure, the transmission gear limiting surface is an arc surface, the transmission gear rotates about a transmission axis, and a distance between the transmission gear limiting surface and the transmission axis, a distance between the tooth top of the plurality of transmission teeth and the transmission axis, and a distance between the tooth top of the abutting teeth and the transmission axis are equal.

According to the actuating assembly of the first aspect of the present disclosure, the actuating assembly further comprises a locking device and a driving member. The locking device is movably provided on the base, the locking device has a locking position and a releasing position, and the locking device is configured to be capable of moving between the locking position and the releasing position. The driving gear and the driving member are configured to be synchronously rotated by a common power source, and the driving member is configured to drive the locking device to move. The driving gear and the transmission gear are configured such that the transmission gear abutting portion is received in the accommodating portion during movement of the locking device from the locking position to the releasing position and during movement from the releasing position to the locking position.

According to a second aspect of the present disclosure, the present disclosure provides a fuel filler or charging inlet flip assembly, comprising a base, a flip, and the actuating assembly described above. The flip is movably mounted on the base. The actuating assembly is provided on the base.

The actuating assembly of the present disclosure can allow for a reduced machining accuracy, and thus allow for a smoother engagement of the driving gear and the transmission gear.

Figure 1B:
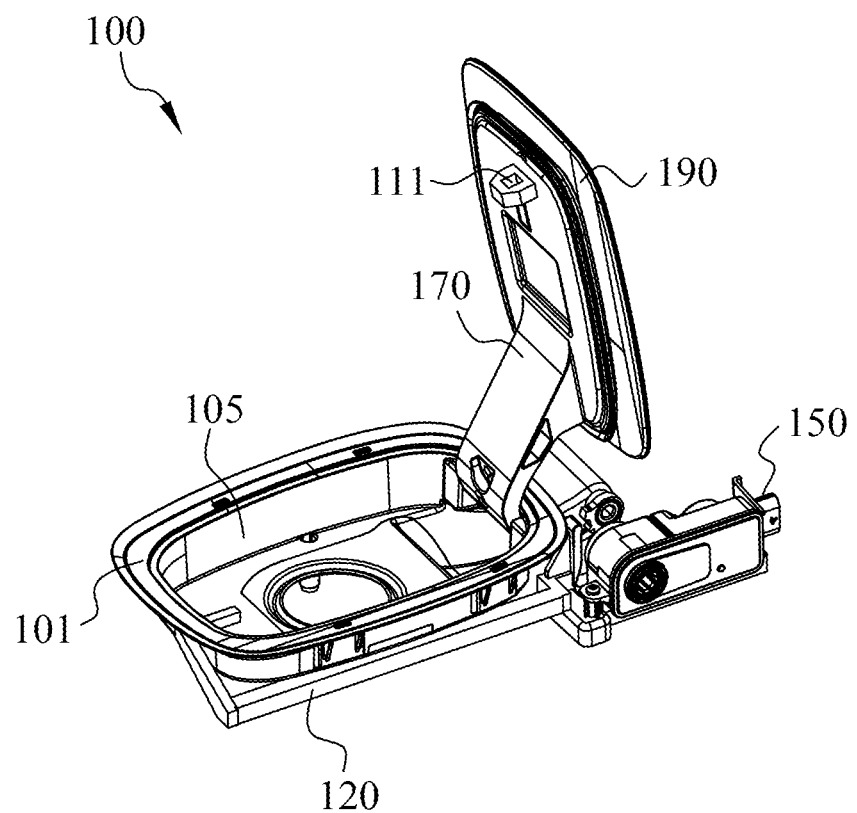
FIG. 1B is a perspective view, viewed from the front, of the fuel filler or charging inlet flip assembly shown in FIG. 1A, with the flip being in an open state.
Figure 1C:
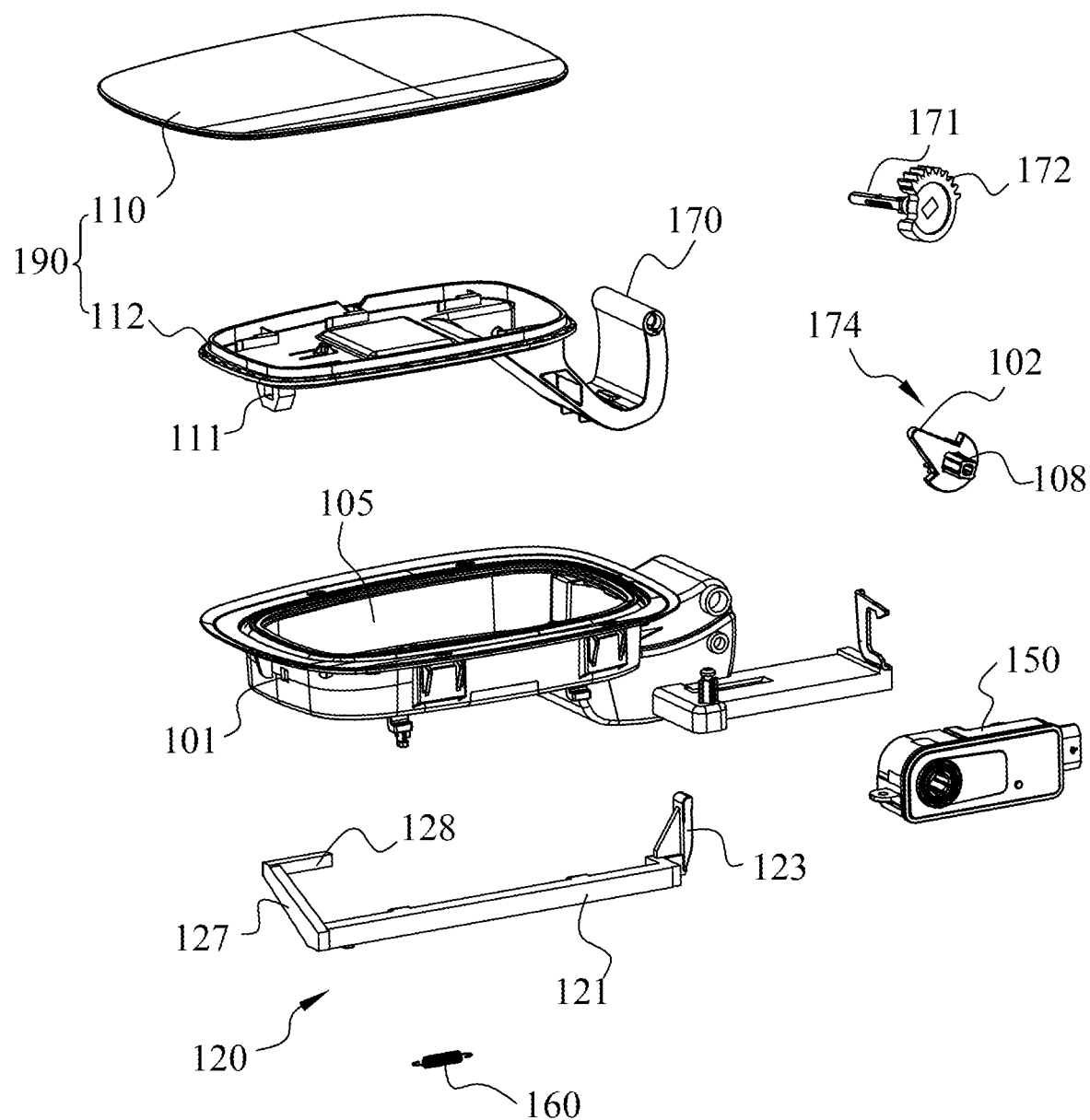
FIG. 1C is an exploded view, viewed from the front, of the fuel filler or charging inlet flip assembly shown in FIG. 1A.
Figure 1D:
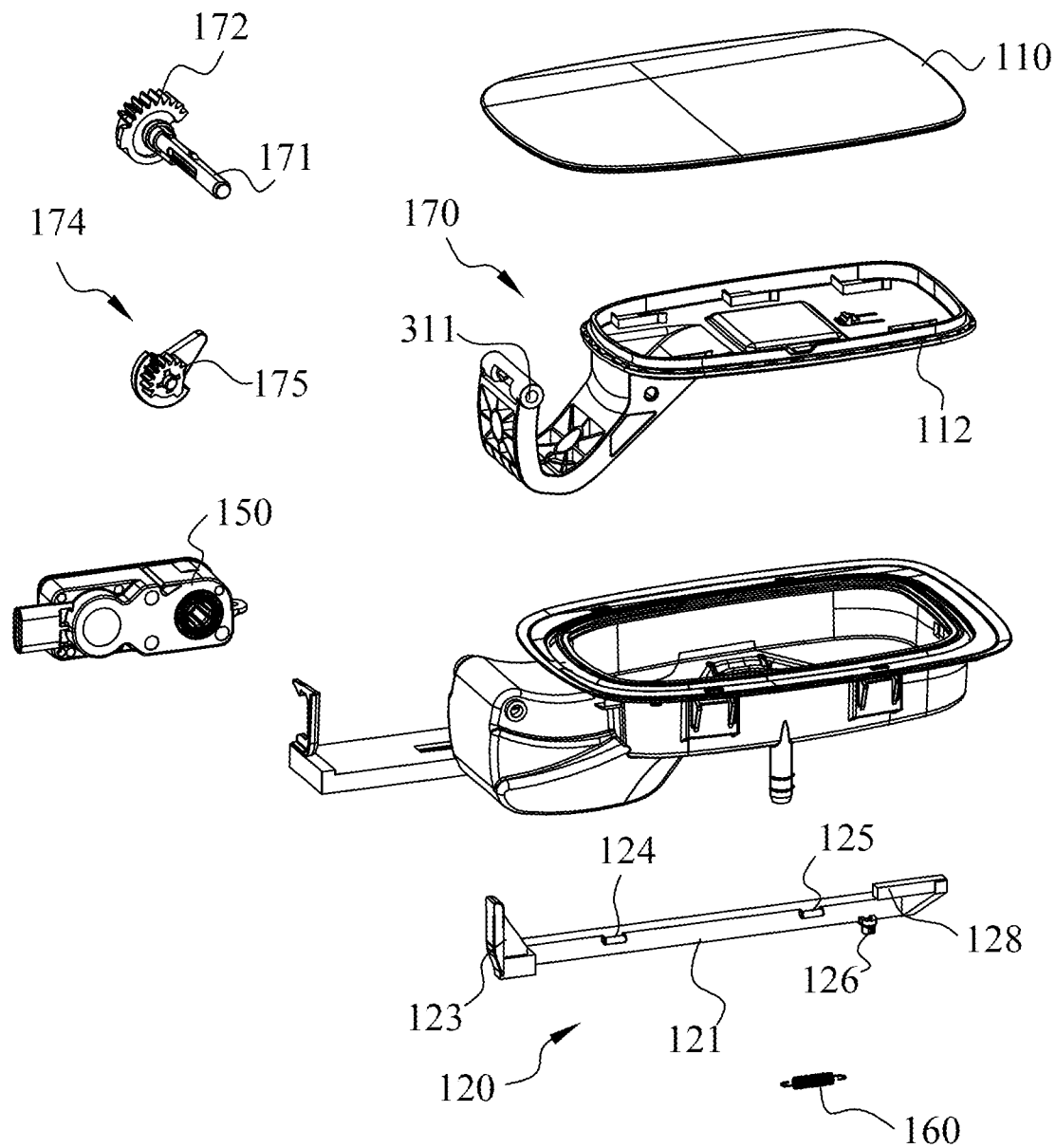
FIG. 1D is an exploded view, viewed from the rear, of the fuel filler or charging inlet flip assembly shown in FIG. 1A.

FIG. 1A is a perspective view, viewed from the front, of an embodiment of a fuel filler or charging inlet flip assembly of the present disclosure, with a flip being in a closed state; FIG. 1B is a perspective view, viewed from the front, of the fuel filler or charging inlet flip assembly shown in FIG. 1A, with the flip being in an open state; FIG. 1C is an exploded view, viewed from the front, of the fuel filler or charging inlet flip assembly shown in FIG. 1A; and FIG. 1D is an exploded view, viewed from the rear, of the fuel filler or charging inlet flip assembly shown in FIG. 1A. For convenience of illustration and description, unless otherwise specified, the right side of a base 101 shown in FIG. 1A is defined as the right side, and the other side opposite to the right side is defined as the left side. The front side of the base 101 shown in FIG. 1A is defined as the front side, and the side opposite to the front side is defined as the rear side.

As shown in FIGS. 1A-1D, a fuel filler or charging inlet flip assembly 100 comprises a base 101, a flip 190, and an actuating assembly. The actuating assembly comprises a hinge 170, a flip rotating shaft 171, a transmission gear 172, a driving device 174, a power source 150, a locking device 120, and an elastic component 160. The hinge 170, the flip rotating shaft 171, the transmission gear 172, the driving device 174, the power source 150, the locking device 120, and the elastic component 160 are mounted on the base 101. Specifically, the base 101 has a cavity 105. The flip 190 comprises a flip body 110 and a connection portion 112. The flip body 110 covers the connection portion 112. The connection portion 112 is connected to the hinge 170. The right end of the hinge 170 is rotatably mounted on the base 101 by means of the flip rotating shaft 171 such that the flip 190 can rotate relative to the base 101. The connection portion 112 is provided with a flip hole 111.

The transmission gear 172 is connected to an end of the flip rotating shaft 171. The flip 190 has a closed position and an open position. When the flip 190 is in the closed position, the flip 190 covers the top of the cavity 105 to seal the top of the cavity 105. When the flip 190 is in the open position, the cavity 105 is exposed to accommodate an external component for refueling or charging. The locking device 120 is mounted on the front side of the base 101 and is configured to lock or release the hinge 112, so as to lock or release the flip 190. The locking device 120 has a locking position and a releasing position. When the locking device 120 is in the locking position, the locking device 120 passes through a through hole 222 (see FIG. 2B) in the base 101 and extends into the flip hole 111 in the flip 190. When the locking device 120 is in the releasing position, the locking device 120 is withdrawn from the flip hole 111 in the flip 190, so that the flip 190 can rotate relative to the base 101.

The power source 150 is mounted at a right lower portion of the front side of the base 101 and is configured to provide a driving force to drive the opening or closing of the flip 190 and to provide a driving force to drive the locking or releasing of the locking device 120. As an example, the power source 150 is an electric motor. The driving device 174 is mounted on the front side of the base 101 and is provided substantially on the rear side of the power source 150. The driving device 174 comprises a driving shaft 108 provided on the front side, a driving gear 175 provided on the rear side, and a driving member 102 provided between the driving shaft 108 and the driving gear 175. The driving shaft 108 is connected to the power source 150 such that the driving device 174 is configured to rotate, driven by the power source 150. The driving gear 175 cooperates with the locking device 120 and the transmission gear 172 such that the rotation of the driving device 174 can drive the locking device 120 and the transmission gear 172 to move. The elastic component 160 is mounted below the base 101 and is configured to provide a force for moving of the locking device 120 from the release position to the locking position. As an example, the elastic component 160 is a spring.

Figure 2A:
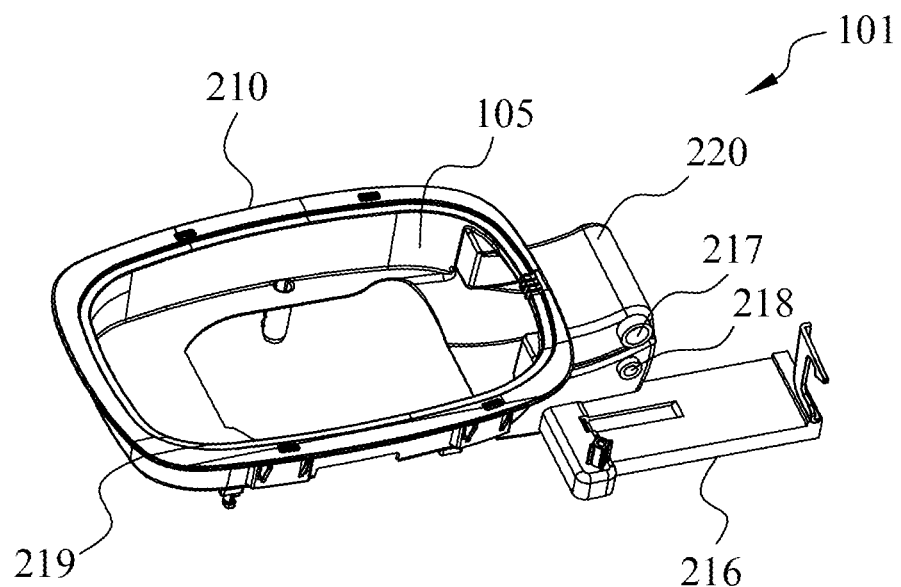
FIG. 2A is a perspective view, viewed from above, of a base shown in FIGS. 1A-1D.
Figure 2B:
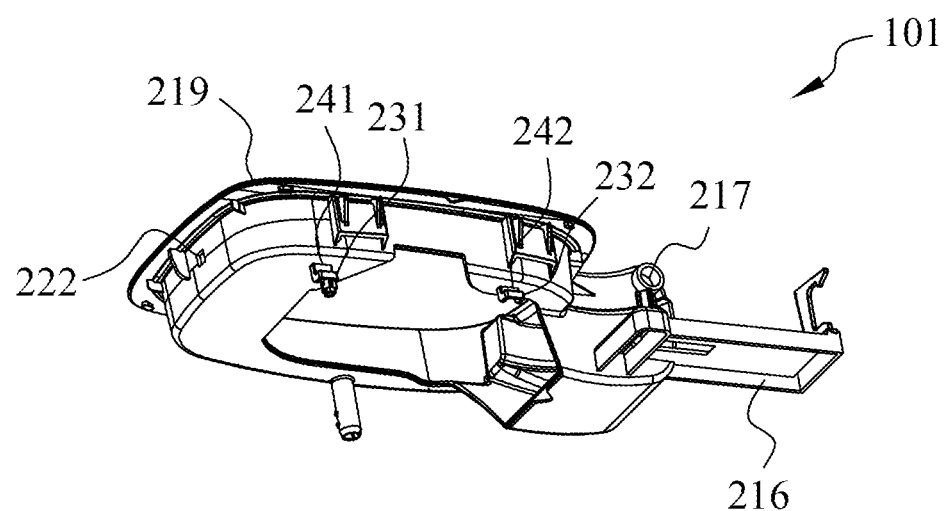
FIG. 2B is a perspective view, viewed from below, of the base shown in FIGS. 1A-1D.

FIG. 2A is a perspective view, viewed from above, of the base 101 shown in FIGS. 1A-1D; FIG. 2B is a perspective view, viewed from below, of the base 101 as shown in FIGS. 1A-1D for more clearly illustrating the specific structure of the base 101. As shown in FIGS. 2A-2B, the base 101 comprises a housing 210 forming the cavity 105, and a mounting portion 220. The mounting portion 220 is connected to the housing 210, and is located at the right end of the base 101. The base 101 can be mounted on a vehicle body of a vehicle by means of the mounting portion 220. The top and the bottom of the cavity 105 of the housing 210 are both opened such that after the flip assembly 100 is mounted on the vehicle body, the cavity 105 is in communication with a fuel filler or a charging inlet of the vehicle. In this way, an external component for refueling or charging may extend into the fuel filler or the charging inlet of the vehicle through the cavity 105. An accommodating cavity (not shown in the figures) in communication with the cavity 105 of the housing 210 is formed in the mounting portion 220 of the base 101 and is configured to accommodate a part of the hinge 170.

A flange 219 that is folded outward is provided at the top of the housing 210 of the base 101. A side wall of the housing 210 is provided with the through hole 222. The through hole 222 is formed in the left end of the base 101 and close to the front side. The through hole 222 is configured to receive a locking pin 128 on the locking device 120 (see FIGS. 1C-1D).

The lower portion of the front side of the base 101 is provided with a protrusion 231 and a protrusion 232. The protrusion 231 and the protrusion 232 extend downward from the bottom of the base 101 toward the front side such that a recess 241 and a recess 242 are formed between the protrusion 231 and the protrusion 232 and the base 101 respectively and are configured to accommodate the locking device 120, thereby guiding and limiting the locking device 120 to move in left and right directions. One end of the elastic component 160 is connected to the protrusion 231 such that the elastic component 160 is connected to the base 101.

A power source mounting plate 216, a flip rotating shaft mounting hole 217, and a driving device mounting portion 218 are provided at the position of the mounting portion 220 on the front side of the base 101. The flip rotating shaft mounting hole 217 and the driving device mounting portion 218 penetrate the base 101 in front and rear directions. The power source 150 is provided on the power source mounting plate 216. The flip rotating shaft mounting hole 217 is configured to accommodate the flip rotating shaft 171, and the driving device mounting portion 218 is configured to have the driving device 174 arranged thereon.

Figure 3:
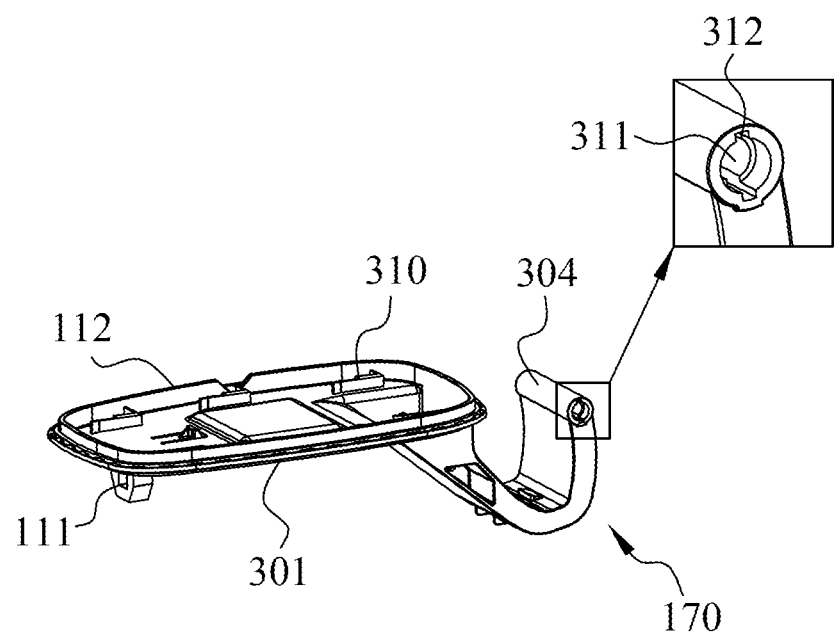
FIG. 3 is a perspective view, viewed from the front, of a hinge and a connection portion of the flip shown in FIGS. 1A-1D.

FIG. 3 is a perspective view, viewed from the front, of the hinge 170 and the connection portion 112 of the flip 190 shown in FIGS. 1A-1D, for illustrating the specific structures of the hinge 170 and the connection portion 112 of the flip 190. As shown in FIG. 3, the hinge 170 and the connection portion 112 of the flip 190 are integrally formed. The hinge 170 is connected to the right side of the connection portion 112. The connecting portion 112 is configured for connection with the flip body 110. Specifically, the top of the connection portion 112 is provided with a hinge snap-fitting portion 310, the bottom of the flip body 110 is provided with a corresponding flip snap-fitting portion (not shown). The hinge snap-fitting portion 310 can cooperate with the flip snap-fitting portion so as to connect the connection portion 112 and the flip body 110 together. The lower side of the left end of the connection portion 112 is provided with the flip hole 111 to form a locking pin receiving portion. When the locking device 120 passes through the through hole 222 in the base 101 and the flip hole 111 (i.e., the locking pin receiving portion) in the connection portion 112 of the flip 190, the locking device 120 can lock the flip 190 and the hinge 170. When the locking device 120 is withdrawn from the flip hole 111, the locking device 120 releases the flip 190 and the hinge 170, and the flip 190 can be opened. The hinge 170 is substantially bent and comprises a hinge rotating shaft 304 provided at an end thereof. The hinge rotating shaft 304 is substantially a cylinder that is accommodated in the flip rotating shaft mounting hole 217 of the base 101 such that the hinge 170 can rotate relative to the base 101. The hinge rotating shaft 304 is provided with a flip rotating shaft accommodating portion 311. The flip rotating shaft accommodating portion 311 is substantially a cylinder that is formed by extending in the front and rear directions. A radial accommodating portion 312 is also provided in a circumferential direction of the front end of the flip rotating shaft accommodating portion 311, and is formed by extending outward in a radial direction thereof. The flip rotating shaft accommodating portion 311 is configured to cooperate with the flip rotating shaft 171 such that the flip rotating shaft 171 can be connected to the hinge 170.

The specific structure of the locking device 120 will be described below with reference to FIGS. 1C-1D. As shown in FIGS. 1C-1D, the locking device 120 comprises a locking rod 121, a locking portion 127, a pushing portion 123, a first guide portion 124, a second guide portion 125, and a protrusion 126. The locking rod 121 has an elongated shape and extends a certain length in the left and right directions. The locking portion 127 is provided at the left end of the locking rod 121 and is substantially in the shape of a hook protruding toward the rear side. One end of the locking portion 127 is connected to the locking rod 121, and the other end thereof forms the locking pin 128. The locking pin 128 can extend into or be withdrawn from the through hole 222 in base 101 and the flip hole 111 in the connection portion 112 of the flip 190, so as to lock the flip 190 to the base 101 or to release the flip 190 from the base 101. The pushing portion 123 is provided at the right end of the locking rod 121 and is substantially plate-shaped. The pushing portion 123 is provided in a vertical direction and is connected to the locking rod 121. The pushing portion 123 is configured to cooperate with the driving device 174.

When the driving device 174 pushes the pushing portion 123, the driving device 174 can push the locking device 120 to move. The first guide portion 124 and the second guide portion 125 are provided on the rear side of the locking rod 121, and the first guide portion 124 and the second guide portion 125 are spaced apart by a certain distance. The first guide portion 124 and the second guide portion 125 can cooperate with the protrusion 232 and the protrusion 231 on the base 101 respectively, so as to guide the locking device 120 to move in the left and right directions. The protrusion 126 is provided on the rear side of the locking rod 121, and is provided between the second guide portion 125 and the locking portion 127. One end of the elastic component 160 is connected to the protrusion 126, and the other end of the elastic component 160 is connected to the protrusion 231 of the base 101.

Figure 4A:
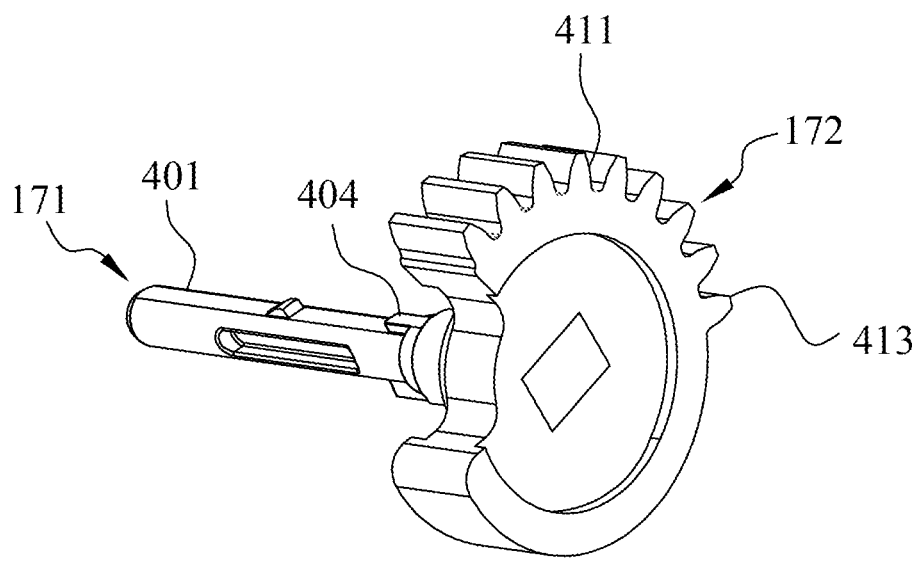
FIG. 4A is a perspective view, viewed from the front, of a flip rotating shaft and a transmission gear shown in FIGS. 1A-1D.

FIG. 4A is a perspective view, viewed from the front, of the flip rotating shaft 171 and the transmission gear 172 shown in FIGS. 1A-1D, for illustrating the specific structures of the flip rotating shaft 171 and the transmission gear 172. As shown in FIG. 4A, the flip rotating shaft 171 comprises a rotating shaft body 401. The rotating shaft body 401 is substantially a cylinder. The rotating shaft body 401 can be accommodated in the flip rotating shaft accommodating portion 311 and in cooperation with the flip rotating shaft accommodating portion 311. The transmission gear 172 is connected to an end of the rotating shaft body 401. The flip rotating shaft 171 has the same axis of rotation as the transmission gear 172. A radial protrusion 404 is provided in a circumferential direction of the end of the rotating shaft body 401 close to the transmission gear 172, and is formed by extending outward in a radial direction of the rotating shaft body 401. The radial protrusion 404 can match the radial accommodating portion 312 on the hinge 170, so as to connect the flip rotating shaft 171 to the hinge 170, avoiding the relative rotation between the flip rotating shaft 171 and the hinge 170.

Figure 4B:
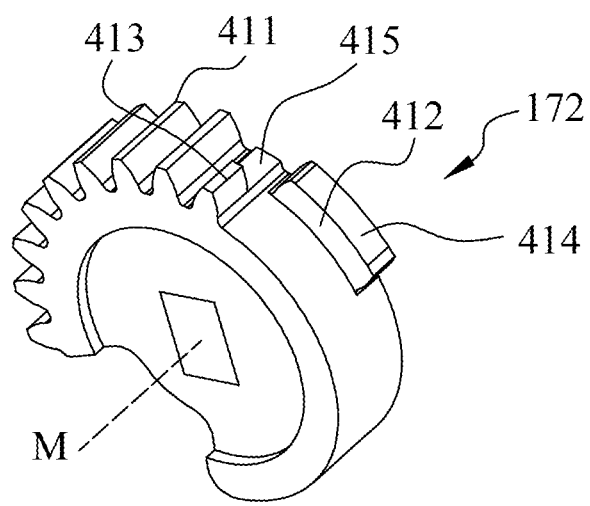
FIG. 4B is a perspective view, viewed from the front, of the transmission gear shown in FIG. 4A.

FIG. 4B is a perspective view of the transmission gear 172 shown in FIG. 4A, for illustrating the specific structure of the transmission gear 172. As shown in FIGS. 4A-4B, the transmission gear 172 is generally circular and has a transmission axis M. The transmission gear 172 can rotate about the transmission axis M. An outer periphery of the transmission gear 172 is provided with a plurality of transmission teeth 411, an abutting tooth 413, and a transmission gear abutting portion 412. The plurality of transmission teeth 411 and the transmission gear abutting portion 412 are provided on two opposite sides of the abutting tooth 413. The plurality of transmission teeth 411 and the abutting tooth 413 can be engaged with a plurality of driving teeth 502 (see FIGS. 5B-5C) on the driving gear 175 such that the driving gear 175 can drive the transmission gear 172 to rotate. The abutting tooth 413 and the plurality of transmission teeth 411 have the same shape, except that the abutting tooth 413 is partly provided in the axial direction. As shown in FIG. 4B, the abutting tooth 413 is provided close to the front side. In other words, the tooth width of the abutting tooth 413 is smaller than the tooth width of the plurality of transmission teeth 411.

The transmission gear abutting portion 412 is partly provided in the axial direction and extends a distance in the circumferential direction. As shown in FIG. 4B, the transmission gear abutting portion 412 is provided close to the rear side so as to be staggered from the abutting tooth 413 in the axial direction. Thus, a first tooth accommodating portion 415 is formed between the transmission gear abutting portion 412 and the transmission tooth 411 adjacent thereto, and is configured to accommodate a first driving tooth 501 among the plurality of driving teeth 502 (see FIG. 5C). The transmission gear abutting portion 412 has a transmission gear limiting surface 414. The transmission gear limiting surface 414 is an arc surface. The transmission gear limiting surface 414 can cooperate with a driving gear limiting surface 510 (see FIGS. 5B-5C). A distance between the transmission gear limiting surface 414 and the transmission axis M, a distance between the tooth top of the plurality of transmission teeth 411 and the transmission axis M, and a distance between the tooth top of the abutting tooth 413 and the transmission axis M are equal.

Figure 5A:
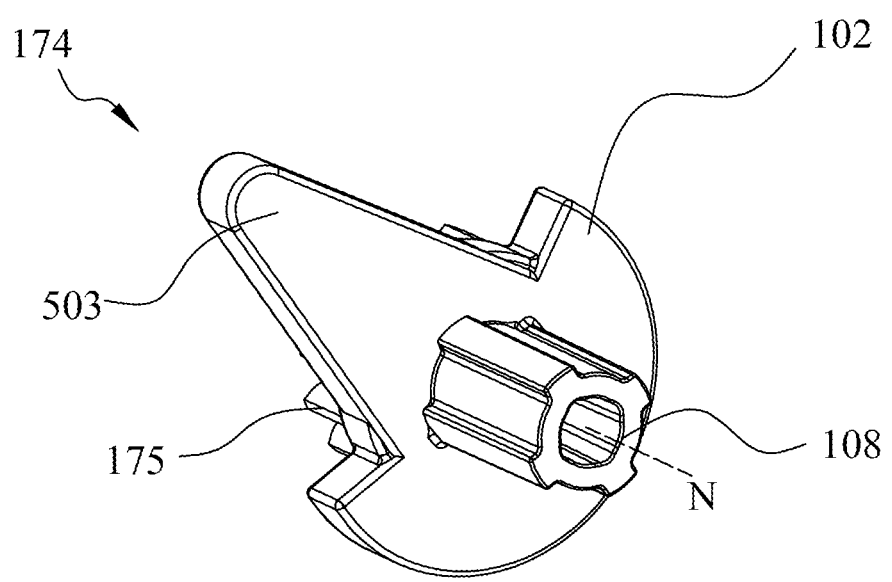
FIG. 5A is a perspective view, viewed from the front, of a driving device shown in FIGS. 1A-1D.

FIG. 5A is a perspective view, viewed from the front, of the driving device 174 shown in FIGS. 1A-1D. As shown in FIG. 5A, the driving device 174 comprises a driving shaft 108, a driving member 102 and a driving gear 175. The driving shaft 108 and the driving gear 175 are provided on the two opposite sides of the driving member 102. The driving gear 175 is provided with a mounting shaft (not shown). The mounting shaft and the driving shaft 108 are provided coaxially. The mounting shaft of the driving device 174 can be accommodated in the driving device mounting portion 218 such that the driving device 174 is provided on the base 101. The driving member 102 is substantially in a sector shape and is provided with a driving arm 503 configured to be in contact with the pushing portion 123 of the locking device 120 (see FIGS. 1C-1D).

Figure 5B:
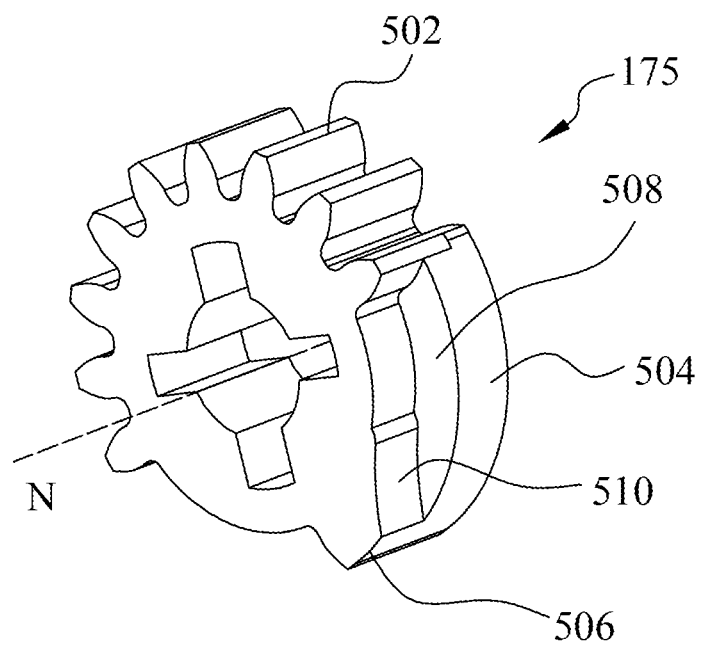
FIG. 5B is a perspective view, viewed from the rear, of a driving gear shown in FIGS. 1A-1D.
Figure 5C:
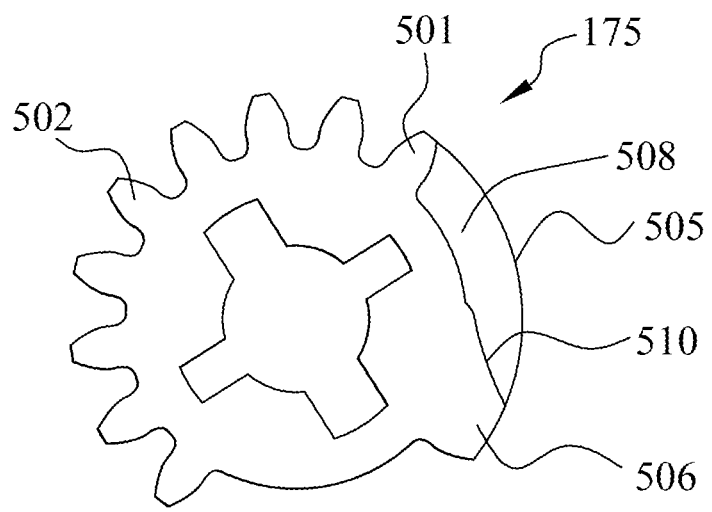
FIG. 5C is a rear view of the driving gear shown in FIG. 5B.

FIG. 5B is a perspective view, viewed from the rear, of the driving gear 175 shown in FIGS. 1A-1D; FIG. 5C is a rear view of the driving gear 175 shown in FIG. 5B, for illustrating the specific structure of the driving gear 175. Specifically, the driving gear 175 has a driving axis N. The driving gear 175 is can rotate about the driving axis N. The outer periphery of the driving gear 175 is provided with a first outer periphery portion and a second outer periphery portion. The first outer periphery portion is provided on one side of the second outer periphery portion in the circumferential direction (i.e., on the left side as shown in FIG. 5B). The first outer periphery portion comprises a plurality of driving teeth 502. The plurality of driving teeth 502 are configured to be capable of engaging with the plurality of transmission teeth 411 and the abutting tooth 413. For clarity of description, the driving tooth of the plurality of driving teeth 502 closest to the second outer periphery portion is referred to as a first driving tooth 501. The second outer periphery portion comprises a driving gear abutting portion 504 and a driving gear limiting tooth 506. The driving gear abutting portion 504 is partly provided in the axial direction, extends a distance in the circumferential direction, and is connected to the adjacent driving tooth 502 (i.e., the first driving tooth 501). As shown in FIG. 5B, the driving gear abutting portion 504 is provided close to the rear side. In other words, the width of the driving gear abutting portion 504 is less than the tooth width of the plurality of driving teeth 502. The driving gear abutting portion 504 does not rotate the transmission gear 172. Specifically, the driving gear abutting portion 504 has a top portion 505. The top portion 505 is configured to be capable of cooperating with the abutting tooth 413 to block rotation of the transmission gear 172. The top portion 505 of the driving gear abutting portion 504 is connected to the first driving tooth 501. The top portion 505 can be connected to the tooth top of the first driving tooth 501 so as to form an arc surface. A distance between the top portion 505 and the driving axis N is equal to a distance between the plurality of driving teeth 502 and the driving axis N.

As shown in FIGS. 5B-5C, the driving gear limiting tooth 506 is partly provided in the axial direction and are staggered from the driving gear abutting portion 504. As shown in FIG. 5B, the driving gear abutting portion 504 is provided close to the front side. The driving gear limiting tooth 506 is circumferentially spaced a distance from the adjacent driving tooth 502 (i.e., the first driving tooth 501) to form the accommodating portion 508 for accommodating the transmission gear abutting portion 412. The driving gear limiting tooth 506 has a driving gear limiting surface 510. The driving gear limiting surface 510 is located on a side portion of the driving gear limiting tooth 506 in the circumferential direction. The driving gear limiting surface 510 can cooperate with the transmission gear limiting surface 414 to limit the range of rotation of the driving gear 175 relative to the transmission gear 172.

Figure 6A:
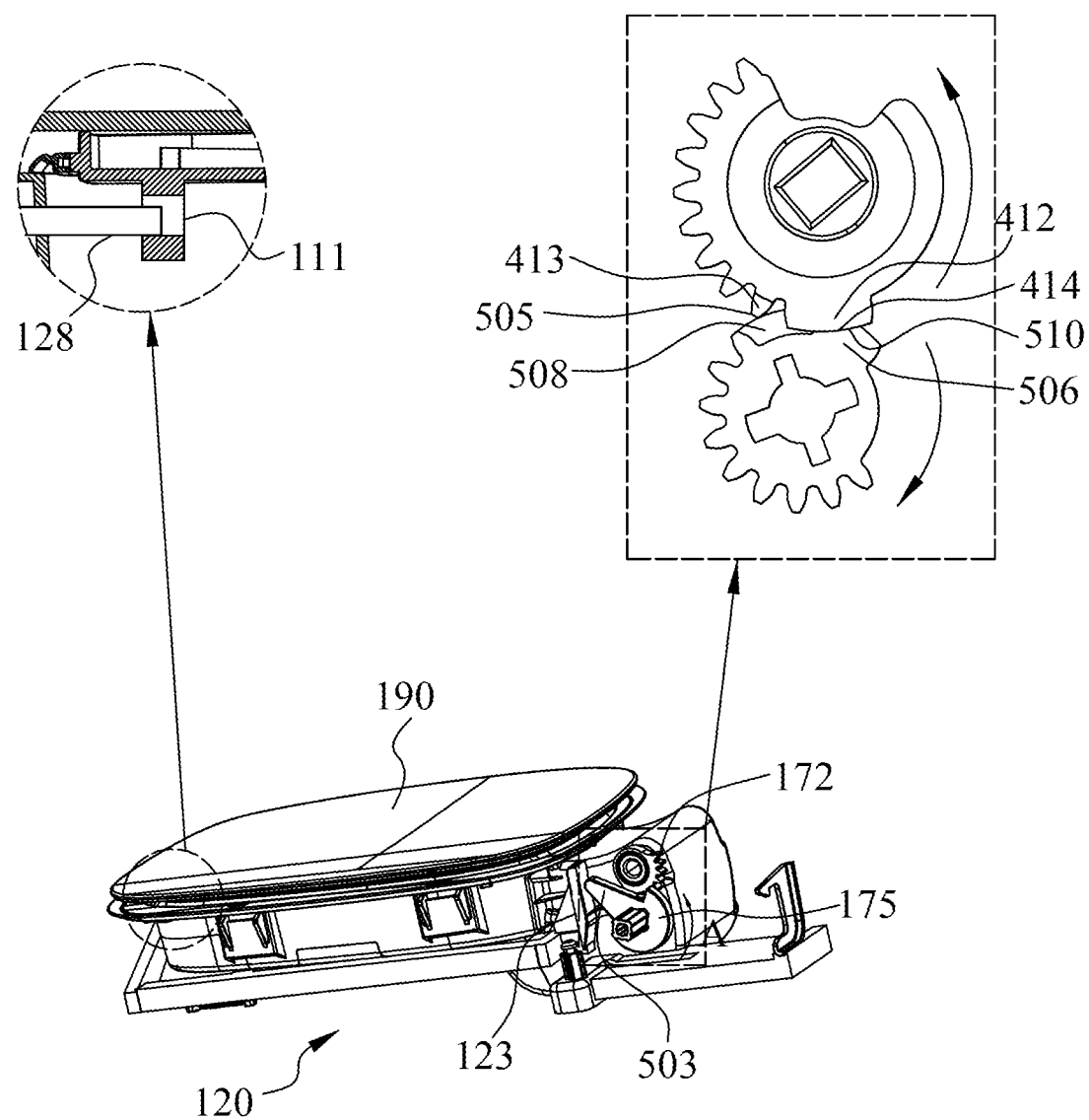
FIG. 6A is a schematic diagram showing the state of the flip assembly when the locking device is in a locking position and the flip is in a closed position.
Figure 6B:
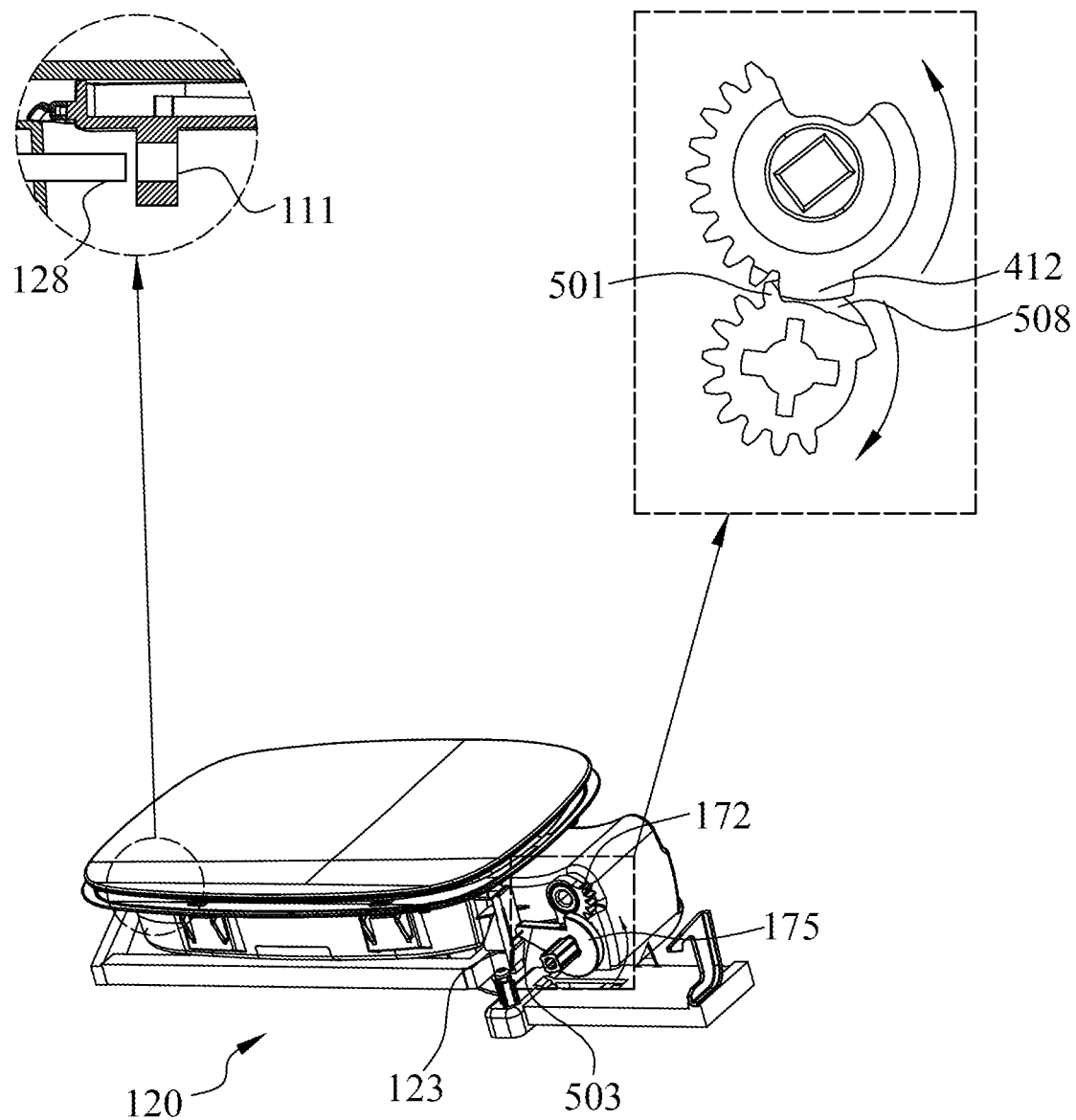
FIG. 6B is a schematic diagram showing the state of the flip assembly when the locking device is in a releasing position and the flip is in the closed position.
Figure 6C:
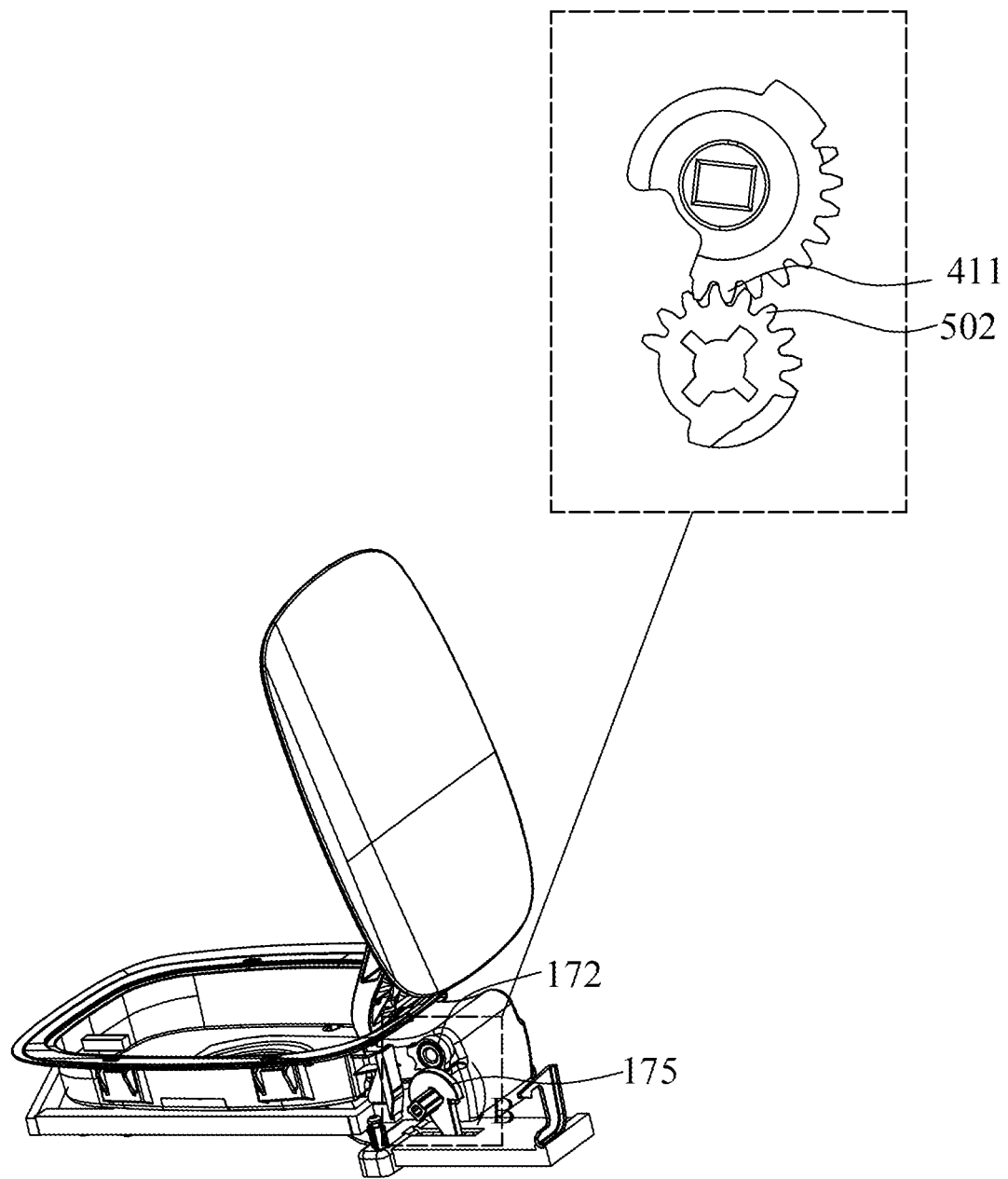
FIG. 6C is a schematic diagram showing the state of the flip assembly when the flip is completely opened.
Figure 6D:
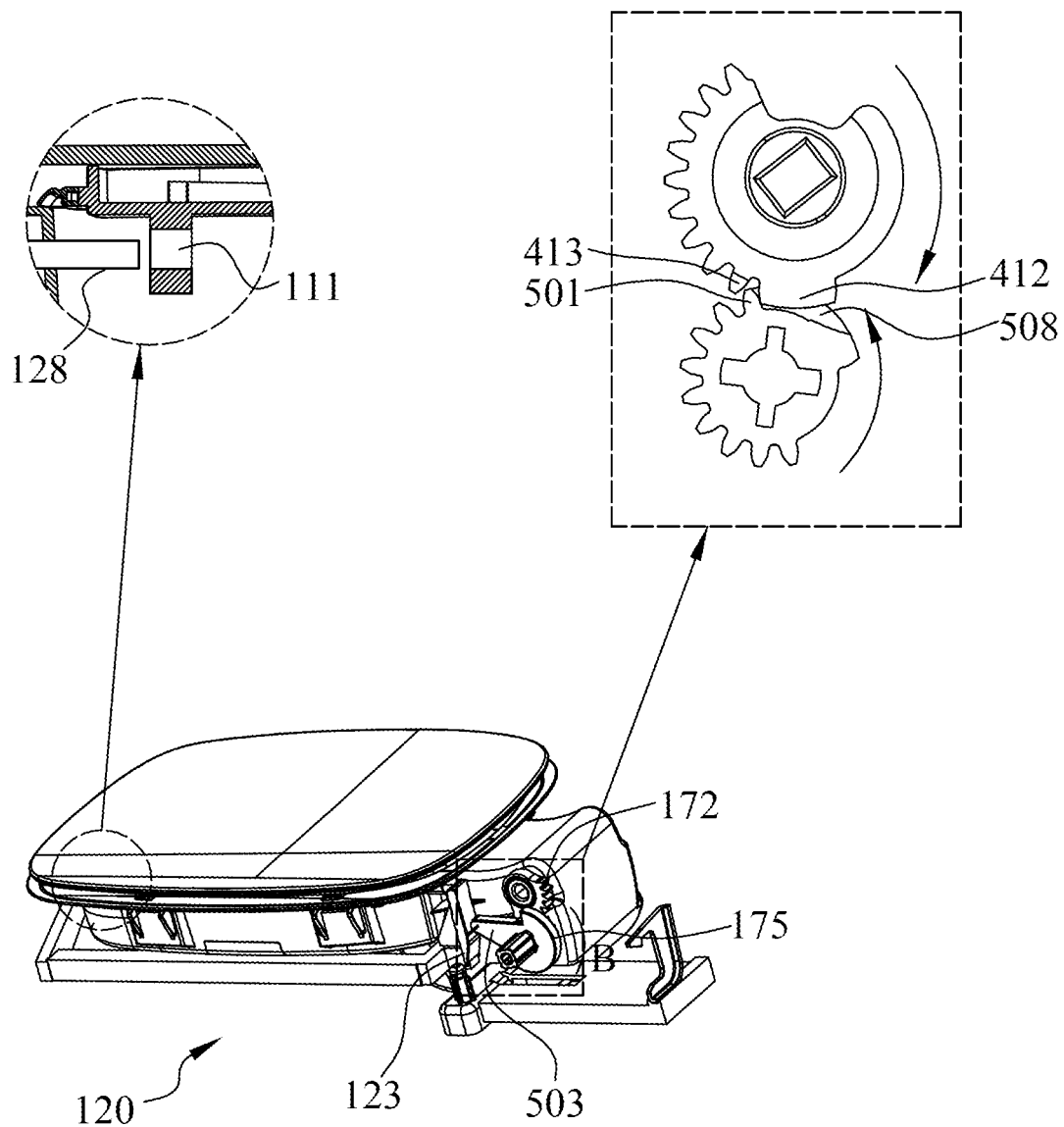
FIG. 6D is a schematic diagram showing the state of the flip assembly when the locking device is in the releasing position and the flip is in the closed position.
Figure 6E:
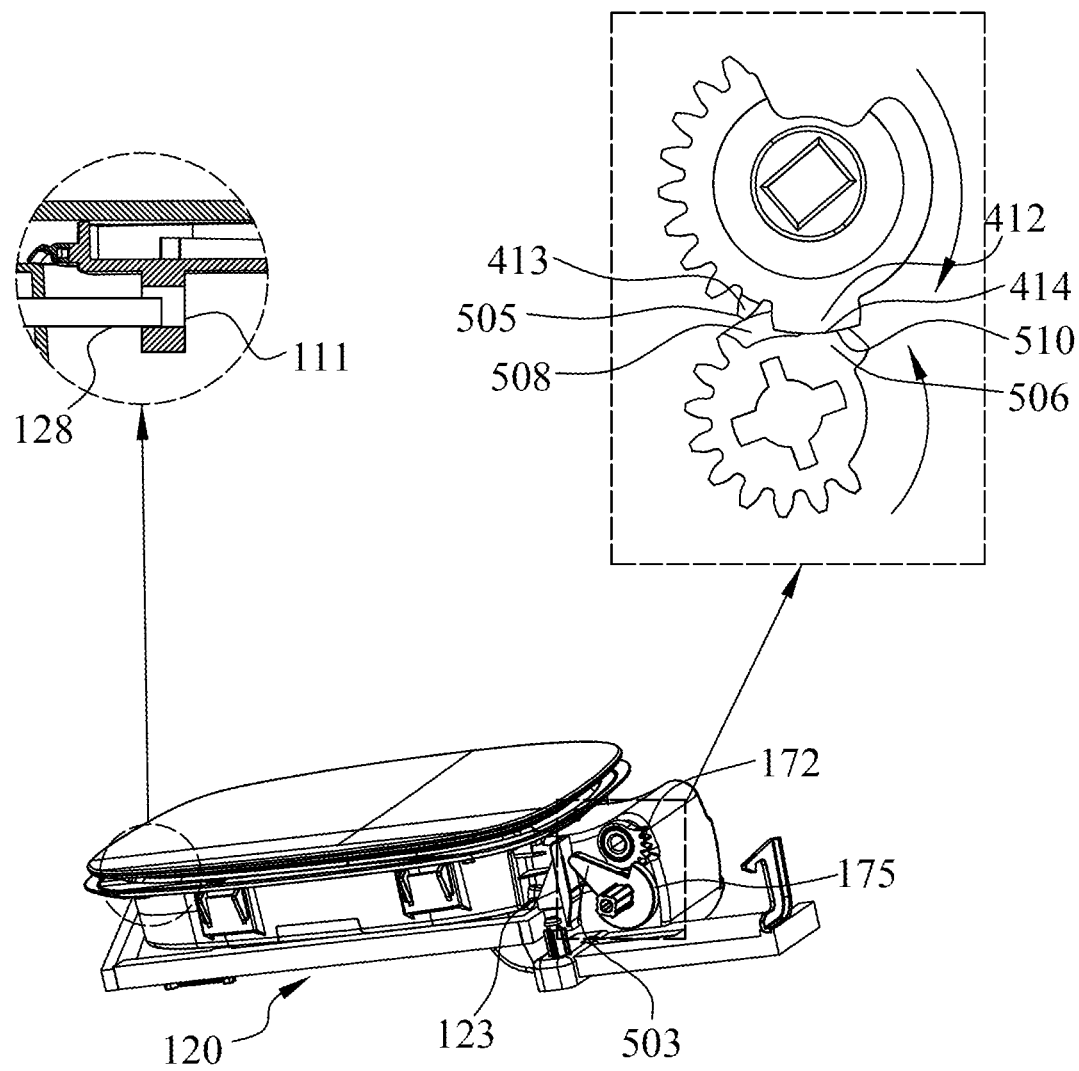
FIG. 6E is a schematic diagram showing the state of the flip assembly when the locking device is in the locking position and the flip is in the closed position.

The process of releasing and opening the flip 190 and the process of closing and locking the flip 190 will be described below with reference to FIGS. 6A-6E:

FIG. 6A is a schematic diagram showing the state of the flip assembly 100 when the locking device 120 is in the locking position and the flip 190 is in the closed position; FIG. 6B is a schematic diagram showing the state of the flip assembly 100 when the locking device 120 is in the releasing position and the flip 190 is in the closed position; FIG. 6C is a schematic diagram showing the state of the flip assembly 100 when the flip 190 is completely opened; FIG. 6D is a schematic diagram showing the state of the flip assembly 100 when the locking device 120 is in the releasing position and the flip 190 is in the closed position; and FIG. 6E is a schematic diagram showing the state of the flip assembly 100 when the locking device 120 is in the locking position and the flip 190 is in the closed position. For the convenience of illustration of the positional relationship of the components in different states in FIGS. 6A-6E, the power source 150 is removed from FIGS. 6A-6E to better illustrate the cooperative relationship of the components of the flip assembly 100. Dashed circular boxes in FIGS. 6A-6E show enlarged cross-sectional views illustrating the cooperative relationship of the locking pin 128 of the locking device 120 and the flip hole 111 of the connection portion 112, and dashed rectangular boxes in FIGS. 6A-6E show enlarged cross-sectional views, viewed from the rear to the front, illustrating the cooperative relationship of the drive gear 175 and the transmission gear 172.

FIGS. 6A-6C show the process of releasing and opening the flip 190. As shown in FIG. 6A, the flip 190 is in the closed position, and the locking device 120 is in the locking position. The locking pin 128 of the locking device 120 is inserted into the through hole 222 of the base 101 and the flip hole 111 in the connection portion 112, thereby retaining the flip 190 in the closed position. In this case, the transmission gear abutting portion 412 of the transmission gear 172 is accommodated in the accommodating portion 508, the transmission gear limiting surface 414 abuts against the driving gear limiting surface 510 of the driving gear limiting tooth 506, and the abutting tooth 413 abut against the top portion 505.

The process from FIGS. 6A to 6B illustrate an unlocking process of the locking device 120. In this process, the power source 150 drives the driving device 174 to rotate in a counterclockwise direction indicated by arrow A, so that the driving member 102 and the driving gear 175 both also rotate in the counterclockwise direction indicated by arrow A (since the driving gear 175 is located on the rear side of the driving member 102, the driving gear 175 rotates in a clockwise direction at the viewing angle shown by the dashed rectangular boxes). During the rotation of the driving member 102 in the counterclockwise direction, the driving arm 503 of the driving member 102 abuts against and pushes the pushing portion 123 of the locking device 120 to withdraw the locking pin 128 from the flip hole 111, so as to drive the locking device 120 to move from the locking position to the releasing position. Moreover, during the rotation of the driving gear 175 in the counterclockwise direction, the transmission gear limiting surface 414 of the transmission gear 172 is gradually disengaged from the driving gear limiting surface 510 of the driving gear limiting tooth 506, but the transmission gear abutting portion 412 is still accommodated in the accommodating portion 508, and the abutting tooth 413 abuts against the top portion 505. In other words, the driving gear 175 does not rotate the transmission gear 172 at this moment. Accordingly, during the process from FIGS. 6A to 6B, the locking device 120 is moved from the locking position to the releasing position, and since the driving gear 175 does not rotate the transmission gear 172, the flip rotating shaft 171 does not move, and the flip 190 still remains in the closed position.

The process from FIGS. 6B to 6C illustrates the process of the flip 190 from the closed position to the open position. In this process, the power source 150 continues to drive the driving device 174 to rotate in the counterclockwise direction indicated by arrow A, and therefore the driving member 102 and the driving gear 175 both also continue to rotate in the counterclockwise direction. As shown in FIG. 6B, during the rotation of the driving gear 175 in the counterclockwise direction, the first driving tooth 501 of the driving gear 175 begins to push the transmission gear abutting portion 412 to rotate, such that the driving gear 175 begins to drive the transmission gear 172 to rotate in the clockwise direction (i.e., a first direction). The plurality of driving teeth 502 are then engaged with the plurality of transmission teeth 411 to continue to drive the transmission gear 172 to rotate in the clockwise direction. In this way, the transmission gear 172 drives the hinge 170 to rotate, moving the flip 190 to the open position shown in FIG. 6C.

It should be noted that during the process shown from FIGS. 6B to 6C, the driving arm 503 of the driving member 102 also rotates in the clockwise direction, and therefore the driving arm 503 continues to push the pushing portion 123 of the locking device 120 such that the locking device 120 remains in the unlocking position. In a state (not shown, referred to as a "separated state") shown from FIGS. 6B to 6C, the driving arm 503 of the driving member 102 is separated from the pushing portion 123 of the locking device 120. That is to say, the driving arm 503 of the driving member 102 stops pushing the pushing portion 123 of the locking device 120. Since the locking device 120 is continuously moved toward the left in the process from the state in FIG. 6B to the separated state, the elastic component 160 is continuously compressed. Until the driving arm 503 of the driving member 102 is separated from the pushing portion 123 of the locking device 120 in the separated state, the elastic component 160 exerts a restoring force to the right to the locking device 120, such that the locking device 120 is moved to the right until it returns to the locking position. However, since the flip 190 has been opened, the locking device 120 returning to the locking position does not restrict the movement of the flip 190.

FIGS. 6C-6E illustrate the process of closing and locking the flip 190:

The process from FIGS. 6C to 6D illustrates the process of the flip 190 from the open position to the closed position. During this process, the power source 150 drives the driving device 174 to rotate in the clockwise direction indicated by arrow B (counterclockwise at the viewing angle shown in the dashed rectangular boxes), so that the drive member 102 and the driving gear 175 both also continue to rotate in the clockwise direction. As shown in FIG. 6C, during the rotation of the driving gear 175 in the clockwise direction, the plurality of driving teeth 502 of the driving gear 175 are engaged with the plurality of transmission teeth 411 such that the clockwise rotation of the driving gear 175 can drive the transmission gear 172 to rotate in the counterclockwise direction (i.e., a second direction), and the rotation of the transmission gear 172 drives the flip 190 to rotate in the counterclockwise direction such that the flip 190 rotates to the closed position as shown in FIG. 6D. In this case, the first driving tooth 501 of the driving gear 175 starts to be disengaged from the abutting tooth 413, and the transmission gear abutting portion 412 is accommodated in the accommodating portion 508.

It should be noted that there is an engaged state in the processes shown from FIGS. 6C to 6D. In the process from the state shown in FIG. 6C to the engaged state, the driving arm 503 of the driving member 102 is always separated from the pushing portion 123 of the locking device 120 until the driving arm 503 of the driving member 102 is in contact with the pushing portion 123 of the locking device 120 in the engaged state. In the process from the engaged state to the state shown in FIG. 6D, the driving arm 503 pushes the pushing portion 123 of the locking device 120 to move the locking device 120 from the locking position to the unlocking position.

In the process from FIGS. 6D to 6E, the power source 150 drives the driving device 174 to continue to rotate in the clockwise direction indicated by arrow B. The plurality of driving teeth 502 of the driving gear 175 are disengaged from the plurality of transmission teeth 411 such that the rotation of the driving gear 175 no longer drives the rotation of the transmission gear 172. The driving gear 175 continues to rotate in the clockwise direction until the driving gear limiting surface 510 of the driving gear limiting tooth 506 of the driving gear 175 abuts against the transmission gear limiting surface 414 of the transmission gear 172, the flip 190 is thus locked in this case, and the transmission gear 172 cannot rotate, so the driving gear 175 is restricted by the transmission gear 172 from continuing to rotate in the clockwise direction. Furthermore, since the driving arm 503 of the driving member 102 continues to rotate in the clockwise direction, the driving arm 503 no longer pushes the pushing portion 123 of the locking device 120 such that the locking device 120 is moved from the unlocking position to the locking position, and the locking pin 128 of the locking device 120 is accordingly inserted into the through hole 222 of the base 101 and the flip hole 111 of the connection portion 112 to remain the flip 190 in the closed position. As shown in FIG. 6E, the abutting tooth 413 abuts against the top portion 505 of the driving gear abutting portion 504. Since the power source 150 does not drive the driving device 174 in this case, the driving gear 175 remains stationary, and the rotation of the transmission gear 172 in the clockwise direction can thus be blocked by the abutment of the abutting tooth 413 against the top portion 505 of the driving gear abutting portion 504.

The actuating assembly of the present disclosure can block, when the flip 190 is closed and the driving gear 175 remains stationary, the rotation of the transmission gear 172 by means of the structures of the driving gear 175 and the transmission gear 172 abutting against each other, thereby preventing the flip 190 from being undesirably opened; moreover, by configuring the abutting structure (e.g., the driving gear abutting portion 504) on the driving gear 175 to only partly extend in the axial direction, the driving gear 175 can drive the transmission gear 172 to move by means of the transmission teeth 502 (i.e., small teeth) thereof when the driving gear 17 drives the transmission gear 175, without the need for driving the transmission gear 172 by means of the abutting structure (i.e., large teeth) on the driving gear 175. Therefore, the actuating assembly of the present disclosure can allow for a reduced machining accuracy, and thus allow for a smoother engagement of the driving gear 175 and the transmission gear 172.

It should be noted that although the flip in the fuel filler or charging inlet flip assembly of the present disclosure is rotatable relative to the base, translation or other movements of the flip relative to the base shall also fall within the scope of protection of the present disclosure.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

What is claimed is:

1. An actuating assembly for actuating a flip movably mounted on a base, comprising:
    a driving gear configured to be capable of being driven to rotate; and
    a transmission gear configured to be capable of rotating in a first direction to open the flip relative to the base and in a second direction opposite to the first direction to close the flip relative to the base, driven by the driving gear,
        wherein an outer periphery of the driving gear is provided with a first outer periphery portion and a second outer periphery portion, the first outer periphery portion is provided on one side of the second outer periphery portion in a circumferential direction, the first outer periphery portion comprises a plurality of driving teeth, the second outer periphery portion comprises a driving gear abutting portion, the driving gear abutting portion is partly provided along an axial direction of the driving gear, extends a distance in a circumferential direction of the driving gear, and is connected to adjacent driving teeth,
        wherein an outer periphery of the transmission gear is provided with a plurality of transmission teeth and an abutting tooth, the abutting tooth is provided on one side of the plurality of transmission teeth in a circumferential direction, the plurality of transmission teeth and the abutting tooth are capable of engaging with the plurality of driving teeth so that the driving gear is capable of driving the transmission gear to rotate, and wherein the driving gear and the transmission gear are configured such that when the flip is closed and the driving gear remains stationary, the abutting tooth is capable of abutting the driving gear abutting portion, thereby blocking rotation of the transmission gear in the first direction, thereby blocking a flip from being opened.

2. The actuating assembly of claim 1, wherein the driving gear abutting portion does not drive the transmission gear to rotate.

3. The actuating assembly of claim 1, wherein the driving gear abutting portion has a top portion configured to be capable of cooperating with the abutting tooth to block rotation of the transmission gear.

4. The actuating assembly of claim 3, wherein the abutting tooth is partly provided along an axial direction of the transmission gear.

5. The actuating assembly of claim 4, wherein an outer periphery of the transmission gear is further provided with a transmission gear abutting portion, the transmission gear abutting portion and the plurality of transmission teeth are provided on two opposite sides of the abutting tooth, and the transmission gear abutting portion is provided along a part of the axial direction of the transmission gear and is offset from the abutting tooth in the axial direction of the transmission gear; and the second outer peripheral portion further comprises a driving gear limiting tooth, and the driving gear limiting tooth is partly provided along the axial direction of the driving gear and staggered from the driving gear abutting portion in the axial direction of the driving gear, wherein an accommodating portion is provided between the driving gear limiting tooth and the adjacent driving teeth for accommodating the transmission gear abutting portion, and wherein the driving teeth connected to the driving gear abutting portion are configured to be capable of pushing the transmission gear abutting portion to rotate the transmission gear.

6. The actuating assembly of claim 5, wherein the driving gear limiting tooth has a driving gear limiting surface, the transmission gear abutting portion has a transmission gear limiting surface, and the driving gear limiting surface is capable of cooperating with the transmission gear abutting portion to limit the range of rotation of the driving gear relative to the transmission gear.

7. The actuating assembly of claim 6, wherein the top portion is an arc surface, the driving gear rotates around a driving axis, and a distance between the top portion and the driving axis is equal to a distance between a tooth top of the plurality of driving teeth and the driving axis.

8. The actuating assembly of claim 6, wherein the transmission gear limiting surface is an arc surface, the transmission gear rotates around a transmission axis, a distance between the transmission gear limiting surface and the transmission axis, a distance between a tooth top of the plurality of transmission teeth and the transmission axis, and a distance between the tooth top of the abutting tooth and the transmission axis are equal.

9. The actuating assembly of claim 5, further comprising:
a locking device movably provided on the base, the locking device having a locking position and a releasing position, the locking device being configured to be capable of moving between the locking position and the releasing position; and
a driving member, the driving gear and the driving member configured to be synchronously rotated by a common power source, the driving member configured to drive the locking device to move,
wherein the driving gear and the transmission gear are configured that: the transmission gear abutting portion is received in the accommodating portion during movement of the locking device from the locking position to the releasing position and during movement of the releasing position to the locking position.

10. A fuel filler or charging inlet flip assembly, comprising:
a base;
a flip movably mounted on the base; and
the actuating assembly of claim 1 provided on the base.

* * * * *